United States Patent Office 3,513,108
Patented May 19, 1970

3,513,108
HYDROTHERMALLY STABLE CATALYST AND
METHOD FOR ITS PREPARATION
George T. Kerr, Trenton, N.J., assignor to Mobil Oil
Corporation, a corporation of New York
No Drawing. Filed Nov. 30, 1967, Ser. No. 686,794
Int. Cl. B01j 11/40
U.S. Cl. 252—455                             6 Claims

ABSTRACT OF THE DISCLOSURE

Briefly, the present invention concerns a novel hydrothermally stable hydrogen zeolite, characterized by a silica to alumina mol ratio of at least 3, prepared by subjecting a hydrogen zeolite to dehydroxylation conditions, but without removing the resultant water from the zeolite atmosphere. It has been found that by so subjecting the zeolite starting material a hydrothermally stable hydrogen zeolite is produced.

BACKGROUND OF THE INVENTION

Field of the invention

This invention relates to a novel hydrothermally stable crystalline aluminisilicate hydrocarbon conversion catalyst, to methods for preparing it and catalytic conversion in the presence thereof.

Description of the prior art

Zeolitic materials, both natural and synthetic, have been demonstrated in the past to have catalytic capabilities for various types of hydrocarbon conversion. Certain zeolitic materials are ordered, porous crystalline aluminosilicates having a definite crystalline structure within which there are a large number of small cavities which are interconnected by a number of still smaller channels. These cavities and channels are precisely uniform in size. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves include a wide variety of positive ion-containing crystalline aluminosilicates, both natural and synthetic. These aluminosilicates can be described as a rigid three-dimensional network of $SIO_4$ and $AlO_4$ in which the tetrahedra are cross-linked by the sharing of oxygen atoms whereby the ratio of the total aluminum and silicon atoms to oxygen atoms is 1:2. The electrovalence of the tetrahedra containing aluminum is balanced by the inclusion in the crystal of a cation, for example, an alkali metal or an alkaline earth metal cation. This can be expressed by formula wherein the ratio of Al to the number of the various cations, such as CA/2 SR/2, Na, K or Li, is equal to unity. One type of cation has been exchanged either in entirety or partially by another type of cation utilizing ion exchange techniques in a conventional manner. By means of such cation exchange, it has been possible to vary the size of the pores in the given aluminosilicate by suitable selection of the particular cation. The spaces between the tetrahedra are occupied by molecules of water prior to dehydration.

Prior art techniques have resulted in the formation of a great variety of synthetic crystalline aluminosilicates. These aluminosilicates have come to be designated by letter or other convenient symbol, as illustrated by zeolite A (U.S. 2,882,243), zeolite X (U.S. 2,882,244), zeolite K–G (U.S. 3,055,654), and zeolite ZK–5 (U.S. 3,247,195), merely to name a few.

A particularly catalytically active form of crystalline aluminosilicates has been the acid or hydrogenform. It has been prepared conventionally by exchanging metal aluminosilicates with acid solutions. However, this treatment has proven too severe for most of the aluminosilicates, especially those with low silica to alumina mol ratios, resulting in the crystal destruction thereof. A more common technique for converting a crystalline aluminosilicate to its acid form involves initially converting it to the ammonium form by base exchange with an ammonium salt solution and thereafter calcining the resulting ammonium aluminosilicate to cause thermal degradation of the ammonium ions. Such degradation results in the release of ammonia gas and the formation of the desired protonic or cationic cites.

Prior art calcination of ammonium crystalline aluminosilicates has been characterized previously by an inexactness in the definition of the calcination conditions. In carrying out such calcination reactions, the prior art has specified conditions such as time, temperature, and the nature of the of the calcination atmosphere; however, little or no consideration has been given to the possible influence of hydrolytic reactions caused by the water formed during calcination. This has effectively prevented prior art investigators from appreciating the extreme importance of calcination conditions to the hydrothermal stability of the subsequent catalysts produced therefrom or to the activity thereof, and has resulted in the formation of catalysts such as the aforementioned acid aluminosilicates which are hydrothermally unstable.

SUMMARY OF THE INVENTION

In accordance with the present invention, there has now been discovered a new hydrothermally stable crystalline aluminosilicate catalyst which is produced by a process which comprises subjecting a hydrogen zeolite starting material, characterized by a silica to alumina mol ratio of at least 3, to dehydroxylation conditions, i.e., calcination at temperatures between about 450° C. to about 850° C., but without removing the resultant chemical water formed by calcination from the zeolite atmosphere. Thus, as a result of allowing the resultant chemical water to remain available for reaction with the zeolite, a hydrothermally stable hydrogen zeolite, as defined above, is produced.

DESCRIPTION OF THE SPECIFIC EMBODIMENTS

The present invention is directed to the discovery that the chemical water formed upon calcination of a hydrogen zeolite can be made to react with the zeolite to yield a product which possesses the structure of the starting material and is extremely stable under hydrothermal conditions. This phenomenon is effected by subjecting the hydrogen zeolite, such as preferably, hydrogen zeolite Y, to calcination conditions which would cause dehydroxylation of zeolite Y except for one critical difference, the chemical water that is obtained from the zeolite is not removed from the zeolite environs, but rather is allowed to remain available for reaction with the zeolite. This is accomplished by maintaining the calcination conditions in a static atmosphere of an inert gas, such as nitrogen, or the like.

It is believed that the phenomenon involved in the production of a catalyst having both excellent hydrothermal stability and high hydrocarbon conversion activity may be explained in connection with the following suggested mechanism, which is not, however, to be deemed as limitative in nature being merely a proposed mechanism.

Hydrogen zeolite Y can be dehydroxylated (also described as "decationized" and "deprotonized") according to the scheme shown below:

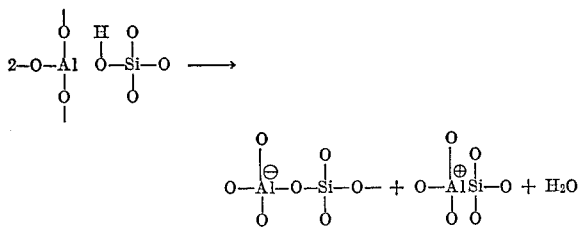

Essentially complete dehydroxylation of hydrogen zeolite Y can be effected by a variety of techniques:

(1) Calcination of HY at $10^{-5}$ to $10^{-6}$ mm. at 550° to 650° C.

(2) Calcination of HY at atmospheric pressure and 700° C. with a continuous flow of inert gas to remove the chemically-derived water from the environs of the zeolite.

(3) Calcination of HY at temperatures of 450° C. or higher with a continuous flow of ammonia to remove the chemically-derived water from the environs of the zeolite.

It has also been found, in copending application Ser. No. 538,655, filed Mar. 30, 1966, that a hydrothermally stable hydrogen zeolite may be produced by adding the water of reaction from an external source, i.e., not from the reaction itself.

The crystalline aluminosilicates employed in preparation of the subject catalyst may be either natural or synthetic zeolites having an ordered internal structure and having a silica to alumina mol ratio of at least 3. Illustrative of preferred zeolites are zeolite Y, zeolite L, zeolite T, erionite, and chabazite. Zeolite Y is especially preferred as a starting material. It has been found that a temperature of about 450° C. is the lowest calcination temperature at which hydrogen zeolite Y has been stabilized using the chemical water derived from the calcined hydrogen zeolite. Maximum temperatures have been found to range up to about 850° C. Preferably a temperature between 550 to about 750° C. is employed.

Hydrothermal stability, as referred to above and throughout the specification, is determined by the ability of the subject catalyst to sorb cyclohexane in amounts above about 15 percent after sorbing water on a sample at room temperature and desorbing by heating to at least 350° C., at rates of at least 10° C./minute.

Catalysts produced in accordance with the present invention are extremely catalytically active and are generally useful in hydrocarbon conversion reactions in which typical acid catalysts are presently employed. For example, the subject catalysts have extremely high cracking activity and may be used to convert materials such as gas oils, full crudes, paraffins, olefins and the like from high to low molecular weight materials. They may also be used in alkylation, dealkylation, isomerization, disproportionation, transalkylation, and many other reactions. Typical reactions in which they may be used are, for example, disproportionation reactions involving the conversion of toluene to benzene and xylenes or the conversion of methylnaphthalene to naphthalene and dimethylnaphthalene to form toluene and naphthalene.

The invention will be described further in conjunction with the following specific examples which are not to be deemed as limitative in nature and are not intended to limit the invention thereto.

EXAMPLE 1

A sample of hydrogen zeolite Y was placed in a Vycor reactor. The reactor contained a static atmosphere of nitrogen, was closed at one end but was open to the atmosphere through a water-cooled reflux condenser at the other end. The reactor was heated to 700° to 750° C. Water condensed on the cool part of the reactor but the quantity of condensed water appeared to diminish after three hours. The sample was cooled in a desiccator and twice was treated with liquid water followed in each case by calcination or reactivation at 500° to 600° C. This material sorbed 17% cyclohexane.

EXAMPLE 2

In the same type apparatus as described in Example 1, hydrogen zeolite Y was heated to 550° in a static nitrogen atmosphere. The zeolite was maintained under these conditions for 3.5 days. The product sorbed 20.8% cyclohexane after two successive water loadings, each followed by calcination or reactivation at 550° to 600° C.

EXAMPLE 3

In the apparatus described above, hydrogen zeolite Y was heated to 550° C. in a static nitrogen atmosphere. Approximately 60 μl. of water was introduced into a portion of the reactor which was at about room temperature. The zeolite was maintained under these conditions for three hours. The product was subjected to two hydrothermal treatments and was then found to have sorbed 19.8% cyclohexane.

EXAMPLE 4

Ammonium zeolite Y was placed in the usual tubular Vycor reactor and heated overnight at 450° C. with a continuous flow of 2 l./minute of dry nitrogen. The reactor and contents were then heated to 600° C.; then ammonia was passed into the reactor until ammonia was detected in the exit stream from the reactor. The reactor was sealed for two hours, after which period the sample was removed from the reactor. The product was given two hydrothermal treatments and was then found to be highly crystalline by X-ray diffraction analysis: it sorbed 17.25% cyclohexane.

The following examples compared the effect of chemical water of reaction to the effect of adding water from an external source, as disclosed in said copending application, on hydrothermal stability.

Ammonium zeolite Y, prepared from the sodium form of the zeolite, had the following composition expressed as atom ratios:

Na/Al _____ 0.04
N/Al _____ 0.94
Si/Al _____ 2.84

A hydrogen zeolite Y was prepared therefrom by conventional shallow bed calcining which released the ammonium proton. A sample of this hydrogen zeolite Y was placed in the Vycor reactor at 700°. After the reactor was sealed, approximately 0.1 ml. of water was injected through a rubber septum into the cool portion of the reactor, which protruded from the front of the furnace. The sample was removed from the reactor after 3 hours and cooled in a desiccator. A portion of the product was given two hydrothermal treatments, and the cyclohexane sorptive capacity measured. Another portion of the sample was first treated with ammonia to produce ammonium ions from Bronsted sites, as described below, and then treated with sodium hydroxide solution to exchange aluminum cations from the product, as previously described; ammonium ion is also exchanged by sodium ion on reaction with sodium hydroxide solution.

Samples were placed in a 1 liter beaker that had been previously flooded with ammonia and were covered with a watch glass. Ammonia was continuously introduced into the bottom of the beaker for 30 minutes. The ammonia-loaded samples were then placed in a vacuum desiccator containing concentrated sulfuric acid. Using a mechanical oil pump, the desiccator was evacuated to about 0.1 mm. pressure and then isolated for 16 to 20 hours. This treatment removed physically adsorbed ammonia but did not remove "protonated ammonia" (amonnium ion) from the zeolite—as may be shown by using ammonium zeolite Y and ammonia-loaded sodium zeolite Y as "blanks".

The product from the reaction of hydrogen zeolite Y with water at 700° and the derivatives prepared from this product were analyzed for sodium, nitrogen, alumina, silica, and ash. The results of this study, summarized in Table I, show that at 700° water converts a hydrothermally unstable hydrogen zeolite Y to a substance that is stable for at least two hydrothermal treatments.

TABLE I.—REACTION OF HYDROGEN ZEOLITE Y WITH WATER AT 700°; COMPOSITION OF PRODUCT AND ITS DERIVATIVES

|  | Atom Ratios | | | Hydrothermal Treatments, g/100 g. Sample |
| --- | --- | --- | --- | --- |
|  | Na/Al | N/Al | Si/Al |  |
| Initial Product | 0.04 | 0 | 2.84 | 16.9 |
| Above Sample After NH₃ Reaction | 0.04 | 0.41 | 2.81 |  |
| Above Sample After NaOH Reaction | 0.81 | 0 | 3.57 |  |

(It has been found that after only one hydrothermal treatment, the hydrogen zeolite sorbs less than 1% cyclohexane.) Furthermore, only about one-half of the aluminum in the product is associated with Bronsetd acid site, and a significant portion of aluminum is removed from the zeolite by sodium hydroxide. These results indicate that the aluminum removed upon sodium hydroxide treatment is ion-exchanged by sodium ion; this finding implies that cationic aluminum is present in the zeolite after the high temperature water treatment.

Reaction of hydrogen zeolite Y with chemical water at 700°

Several minutes after placing hydrogen zeolite Y in a Vycor reactor at 700° and sealing it, liquid water was observed on the cool parts of the reactor.

Differential thermal analyses and thermogravimetric analyses have shown that hydrogen zeolite Y undergoes a rapid loss of chemical water at 650 to 750° and atmospheric pressure. The chemical water is presumed to be derived from the reaction

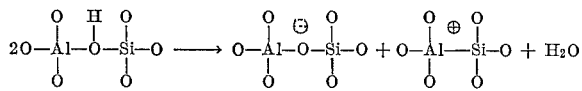

although this mechanism is merely proposed and not to be deemed limitative.

After 3 hours the condensed water had disappeared and the zeolite was removed from the reactor and cooled.

Hydrothermal stability checks and ammonia and sodium hydroxide solution reactions were then carried out as described above. The results are summarized in Table II.

The results in this table are generally similar to those in Table I, indicating surprisingly that chemically-derived water yields a hydrothermally stable product as does externally added water.

TABLE II.—REACTION OF HYDROGEN ZEOLITE Y WITH CHEMICAL WATER AT 700°; COMPOSITION OF PRODUCT AND ITS DERIVATIVES

|  | Na/Al | N/Al | Si/Al | Cyclohexane Sorption After Two Hydrothermal Treatments, g./100 g. Sample |
| --- | --- | --- | --- | --- |
| Initial Product | 0.04 | 0 | 2.84 | 16.4 |
| Above Sample After NH₃ Reaction | 0.04 | 0.44 | 2.84 |  |
| Above Sample After NaOH Reaction | 0.88 | 0 | 3.41 |  |

What is claimed is:

1. A process for producing a hydrothermally stable catalyst composition which comprises subjecting a hydrogen crystalline aluminosilicate zeolite, characterized by a silica to alumina mol ratio of at least 3, to calcination conditions comprising calcination at temperatures between about 450 and 850° C., in a static atmosphere of an inert gas and allowing the resultant chemical water formed by said calcination to react with the resultant crystalline aluminosilicate.

2. The process of claim 1 wherein said crystalline aluminosilicate is zeolite Y.

3. The process of claim 1 wherein said temperature is between about 550 and 750° C.

4. The catalyst produced according to the process of claim 1.

5. The catalyst produced according to the process of claim 3.

6. The catalyst produced according to the process of claim 2.

References Cited

UNITED STATES PATENTS 3,354,077  11/1967  Hansford _____ 252—455 X
3,407,148  10/1968  Eastwood et al. _____ 252—455

PATRICK P. GARVIN, Primary Examiner

C. F. DEES, Assistant Examiner

UNITED STATES PATENT OFFICE
CERTIFICATE OF CORRECTION

Patent No. 3,513,108    Dated May 19, 1970

Inventor(s)    GEORGE T. KERR

It is certified that error appears in the above-identified patent and that said Letters Patent are hereby corrected as shown below:

Col. 1, Line 48 "SIO4" should be --SiO4--
Col. 1, Line 56 "CA/2" should be --Ca/2--
Col. 1, Line 57 "SR/2" should be --Sr/2--
Col. 4, Line 74 "(amonnium ion)" should be --ammonium ion--
Col. 5, Line 11 "at 700°;" should be --at 700°:--
Col. 5, Line 23 "Bronsetd" should be --Bronsted--
Col. 5, Line 30 "Reaction of hydrogen zeolite Y with chemical water at 700°" should be underlined
Col. 5, Line 40
"
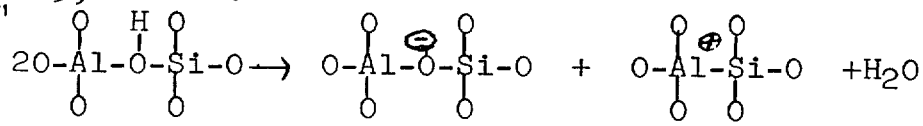
should be
--
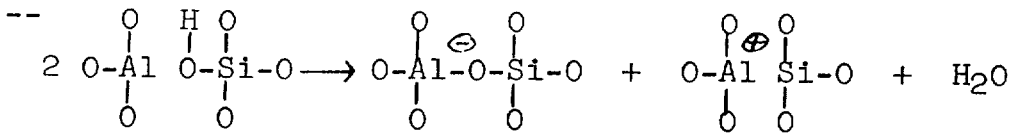
--

Col. 6, Line 9 "at 700°;" should be --at 700°:--

SIGNED AND
SEALED
NOV 10 1970

(SEAL)
Attest:

Edward M. Fletcher, Jr.
Attesting Officer

WILLIAM E. SCHUYLER, JR.
Commissioner of Patents